(12) United States Patent
Lang et al.

(10) Patent No.: US 7,851,961 B2
(45) Date of Patent: Dec. 14, 2010

(54) SYSTEM AND METHOD WITH A ROTOR HAVING PARALLEL SIDED ROTOR BARS

(75) Inventors: Nicholas Lang, Cincinnati, OH (US); Timothy Ernst, Midland, OH (US)

(73) Assignee: Siemens Industry, Inc., Alpharetta, GA (US)

( * ) Notice: Subject to any disclaimer, the term of this patent is extended or adjusted under 35 U.S.C. 154(b) by 170 days.

(21) Appl. No.: 12/207,600

(22) Filed: Sep. 10, 2008

(65) Prior Publication Data
US 2009/0079289 A1    Mar. 26, 2009

Related U.S. Application Data

(60) Provisional application No. 60/973,958, filed on Sep. 20, 2007.

(51) Int. Cl.
    *H02K 17/16* (2006.01)
(52) U.S. Cl. .................................................. 310/211
(58) Field of Classification Search .................. 310/45, 310/211, 216.004, 216.069; *H02K 17/16*
    See application file for complete search history.

(56) References Cited

U.S. PATENT DOCUMENTS 2,304,067 A * 12/1942 Anderson .................... 164/493
3,902,087 A * 8/1975 Hakamada et al. .......... 310/211
4,064,410 A * 12/1977 Roach ......................... 310/211
4,139,790 A * 2/1979 Steen ....................... 310/156.83
2005/0040726 A1* 2/2005 Sato .......................... 310/211

FOREIGN PATENT DOCUMENTS

DE    3539543 A1 * 5/1987
GB     892804 A    3/1962
JP    58204752    11/1983

OTHER PUBLICATIONS

William R. Finley, "Selection of Best Induction Motor Rotor Cnstruction Method", Conference Record of the 2001 Annual Pulp and Paper Industry Technical Coinference. Portland, or, Jun. 18-22, 2001 [Annual Pulp & Paper Conference], New York, NY : IEEE, US, Jun. 18, 2001, pp. 48-58, XP010558685.

* cited by examiner

*Primary Examiner*—Tran N Nguyen
(74) *Attorney, Agent, or Firm*—Filip A. Kowalewski

(57) ABSTRACT

The present invention relates generally to motor rotors. More particularly, the invention encompasses a motor rotor having at least one rotor bar. The invention also includes a system and method with a rotor having parallel sided rotor bars. The rotor bar preferably has a core and at least one layer of a rotor bar shim.

19 Claims, 1 Drawing Sheet

SYSTEM AND METHOD WITH A ROTOR HAVING PARALLEL SIDED ROTOR BARS

CROSS-REFERENCE TO RELATED APPLICATION

The instant patent application is related to U.S. Provisional Patent Application Ser. No. 60/973,958, filed on Sep. 20, 2007, titled "System And Method With A Rotor Having Parallel Sided Rotor Bars," the entire disclosure of which is incorporated herein by reference.

FIELD OF THE INVENTION

The present invention relates generally to motor rotors. More particularly, the invention encompasses a motor rotor having at least one rotor bar. The invention also includes a system and method with a rotor having parallel sided rotor bars. The rotor bar preferably has a core and at least one layer of a rotor bar shim.

BACKGROUND INFORMATION

A high speed motor, such as, an AC induction motor, typically includes a rotor core, which typically has a substantially cylindrical, longitudinally extending body portion. The rotor core also has a rotor shaft bore and a plurality of rotor bar slots. The rotor bar slots sometimes are referred to as secondary conductor slots.

The rotor core typically is formed by a plurality of steel laminations. More specifically, each lamination is stamped from a steel sheet, and has a central opening and a plurality of spaced, radially arranged openings adjacent the lamination outer periphery. The laminations are typically arranged in a stack so that the openings at the outer periphery of the laminations are aligned to form rotor bar slots having end rings and the central openings are aligned to form the rotor shaft bore.

To complete the rotor formation process for a standard cast aluminum type rotor, rotor bars are cast in the rotor bar slots and end rings are cast at the opposing ends of the core using, for example, an aluminum casting process. The rotor bars typically extend through the slots and the end rings "short" the bars together at the ends of the rotor core. A rotor shaft extends into the rotor shaft bore and is secured to the rotor core by any suitable process, such as, for example, interference fit or keying. Such a rotor sometimes is referred to in the art as a "squirrel cage" type rotor.

It has been known that as the rotor temperature and/or speed increases, the steel rotor core expands radially at a rate and to an extent different from the expansion rate and extent of the aluminum rotor bars and end rings. This differential radial expansion results in stresses on the rotor. One high stress region of particular concern is the interface region between the rotor end rings and the rotor bars at the outermost steel core lamination. If the stresses become substantial, the end rings can break away from the rotor bars and the rotor would fail, or in some cases the rotor bar would slide out of the rotor bar slot and make the rotor to operate less efficiently than desired.

U.S. Pat. No. 4,331,895 (John D. Edick, et al.), the disclosure of which is incorporated herein by reference, discloses a squirrel cage rotor with lamination, wherein cooling ducts and passages are provided in the rotor. A first rotor section may be of standard laminations and only one type of duct section has radially extending passageways between fingers. The entire duct section is made from a plurality of laminations having such fingers radially extending from the central core portion of the individual laminations so that the radial passageways extend to the inner wall of longitudinal ventilating ducts. In the outer ends of each finger a rotor bar aperture is formed so that the finger is a casing for such rotor bar. Initially, each duct lamination has a unitary bridge at the outer periphery joining adjacent fingers to add rigidity to the fingers. The assembled stacks of laminations making the two rotor sections are then cast with molten metal, e.g., aluminum, under low pressure to form a squirrel cage. Afterward, the rotor periphery is machined to remove the unitary bridges and to open the spaces between the fingers to act as radial vent passageways. These passageways communicate with longitudinally extending vent ducts within the rotor.

U.S. Pat. No. 5,990,595 (James Robert Crowell), the disclosure of which is incorporated herein by reference, discloses rotors and methods of assembling such rotors for electric motors. In one embodiment, the rotor includes a substantially cylindrical core having substantially planar first and second end surfaces and a substantially cylindrical body portion. The rotor core body portion has first, second and third body sections. The first body section has an outer diameter less than an outer diameter of the second body section, and the third body section has an outer diameter approximately about equal to the outer diameter of the first body section. The first and third body sections sometimes are referred to as end sections or core extensions. A plurality of radially arranged rotor bar slots extend through the body portion, and a plurality of rotor bars are cast in the rotor bar slots. The rotor bar slots in the end sections have a first geometric cross-sectional shape and the rotor bar slots in the second body section have a second geometric cross-sectional shape. The rotor bar slot geometry in the end sections is selected to allow outward displacement of the rotor bars in the radial direction.

U.S. Pat. No. 6,092,277 (Mark F. Beltowski, et al.), the disclosure of which is incorporated herein by reference, discloses a method for reducing the movement of a rotor cage relative to a rotor core in a rotor assembly, such as found in a squirrel cage AC induction motor. Movement is reduced by forming a depression in a portion of a rotor bar of the rotor cage. Formation of the depression displaces rotor bar material adjacent to the depression. The displacement of rotor bar material deforms an adjacent portion of the rotor core thereby fixing the rotor cage to the rotor core. The reduction in movement between the rotor cage and the rotor core is dependent on various depression geometries, quantities and positions. The invention further includes a rotor assembly with a substantially cylindrical rotor core having longitudinally extending slots on its outer surface. A rotor bar is positioned in at least one of the slots. The rotor assembly has at least one depression formed in a rotor bar which displaces rotor bar material into the rotor core, whereby the rotor bar is substantially fixed into a desired position with respect to the rotor core.

U.S. Pat. No. 6,534,891 (Gerald B. Kliman, et al.), the disclosure of which is incorporated herein by reference, discloses an induction motor rotor comprising a rotor shaft, a rotor core, which may be solid or may include a plurality of rotor laminations, having rotor bar slots, a plurality of rotor bars extending through the rotor bar slots, and two rotor end rings brazed to the rotor bars and extending to the rotor shaft, the rotor bars and rotor end rings pre-stressing the rotor core.

U.S. Patent Publication No. 20020145357 (Yue Li, et al.), the disclosure of which is incorporated herein by reference, discloses a rotor bar cross-section and a rotor lamination slot defining an asymmetrical shape which is divided into first and second sides about a longitudinally extending centerline, with the first and second sides being asymmetrical relative to the centerline. The first longitudinal side has upper and lower portions connected by a middle portion. The upper, middle and lower portions each include a respective point on the outer periphery of the bar located farthest from the centerline. These respective points define first, second and third distances between the respective points and the centerline, with the second distance being less than either of the first and third distances. The second longitudinal side has an upper portion directly connected to a lower portion. In certain embodiments, pairs of slots are arranged "face to face" to maintain the symmetry of the rotor lamination, even though the slots or bars themselves are asymmetrical. This improves manufacturability by allowing the use of traditional rotor construction methods for symmetrical rotor slots.

Thus, a need exists for an improved motor rotor.

This invention overcomes the problems of the prior art and provides an inventive motor rotor having at least one insertable improved rotor bar.

PURPOSES AND SUMMARY OF THE INVENTION

The invention is a novel motor rotor.

Therefore, one purpose of this invention is to provide a novel motor rotor.

Another purpose of this invention is to provide a motor rotor having at least one insertable rotor bar.

Yet another purpose of this invention is to provide a rotor having parallel sided rotor bars.

Still yet another purpose of this invention is to provide a rotor bar which has a core and at least one layer of a rotor bar shim.

Therefore, in one aspect this invention comprises a motor rotor, comprising:

(a) rotor having a substantially circular peripheral edge;

(b) at least one channel inwardly opening from said peripheral edge and forming an inner entrance and a peripheral entrance; and (c) a rotor bar slot, wherein said rotor bar slot has a slot base, two substantially parallel side walls originating from said slot base and each side wall terminating at a slot angled tip wall, and wherein said slot angled tip wall connects said rotor bar slot to said inner entrance of said channel, and thereby forming said motor rotor.

In another aspect this invention comprises a rotor bar, comprising a rotor bar base, two substantially parallel side walls originating from said bar base and each side wall terminating at a bar angled tip wall, so as to form a substantially rectangular lower body and a substantially triangular upper body, and thereby forming said rotor bar.

In yet another aspect this invention comprises a motor rotor, comprising:

(a) a rotor having a substantially circular peripheral edge;

(b) at least one channel inwardly opening from said peripheral edge and forming an inner entrance and a peripheral entrance;

(c) a rotor bar slot, wherein said rotor bar slot has a slot base, two substantially parallel side walls originating from said slot base and each side wall terminating at a slot angled tip wall, and wherein said slot angled tip wall connects said rotor bar slot to said inner entrance of said channel;

(d) a rotor bar, comprising a rotor bar base, two substantially parallel side walls originating from said bar base and each side wall terminating at a bar angled tip wall, so as to form a substantially rectangular lower body and a substantially triangular upper body; and (e) wherein said rotor bar slot accommodates said rotor bar such that at least a portion of said triangular upper body is inside at least a portion of said channel, and thereby forming said motor rotor.

BRIEF DESCRIPTION OF THE DRAWINGS

The features of the invention that are novel and the elements characteristic of the invention are set forth with particularity in the appended claims. The drawings are for illustration purposes only and are not drawn to scale. Furthermore, like numbers represent like features in the drawings. The invention itself, both as to organization and method of operation, may best be understood by reference to the detailed description which follows taken in conjunction with the accompanying drawings in which:

DETAILED DESCRIPTION

For applications in induction motors, the inventive parallel sided rotor bar which incorporates an angled tip will help ease the manufacturing and also the insertion of the rotor bars into a rotor core. The angled tip of the inventive rotor bar also allows for high starting torque and low starting current for an induction motor. Additionally, the use of a broad cross-section and simple geometry having parallel sides enable the use of a rotor bar shim which would not be possible with similar performing designs due to the geometry of the bar. Also, the angled tip allows for similar starting performance to designs which incorporate a narrow tip while alleviating both mechanical stresses and thermal stresses. Mechanical stresses occur primarily where the rotor bar tip meets the body of the rotor, and the thermal stresses are normally associated with high current, for example, starting conditions. Also, the parallel sides prevent the rotor bar from rising in the rotor bar slot during the insertion process and also enables sharper angled tips. As stated earlier that the sharper angles tips also enable the motor to operate at higher torques.

As stated earlier conventional design of a rotor bar of an induction motor are typically extruded to form a rectangular bar and these geometries cause a conventional rotor to have less advantageous performance during starting. Non-conventional geometries, without parallel sided bodies, cause the rotor bar to be more difficult to insert, especially, into longer cores, and which also causes the rotor bar to ride up in the rotor bar slot during insertion. This has also resulted in the torque of the motors with conventionally shaped rotor bars to be restricted or reduced. Furthermore, the geometries of a non-conventional or machined rotor bar do not provide the necessary space, particularly when the sides of the rotor bar form a concave geometry, to enable it to be shimmed. As a result, without shimming, stress is asserted on the rotor bar during motor operation which causes excessive rotor bar cracking and subsequent motor failures. Very narrow tips from non-conventional rotor bars also cause uneven thermal expansion, stress, and failure due to the nature of the current distribution inside the rotor bar. Failed rotors then need to be, replaced which results in a loss of motor operation and additional excessive manufacturing costs due to rotor bar replacements.

Figure 1:
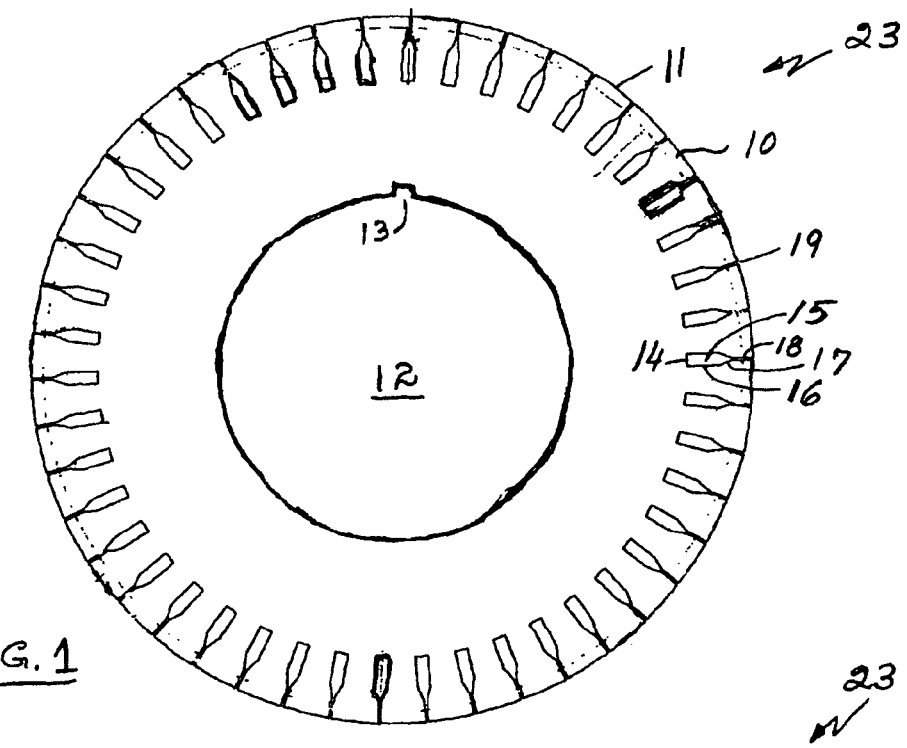
FIG. 1 is a top view of the inventive motor rotor illustrating an embodiment of the present invention.

FIG. 1 is a top view of the inventive motor rotor 23, illustrating an embodiment of the present invention. The motor rotor 23, comprises at least one rotor 10, wherein the rotor 10, has a round or circular peripheral edge 11. The rotor 10, has a central opening 12, and optionally at least one key slot or notch 13. The rotor 10, also has a plurality of peripheral openings or channels 19, that start from the peripheral edge 11, and are defined by rotor channel sides 18, and open into a rotor bar slot or opening 15. The rotor bar slot or opening 15, has a base or lower portion that is rectangular and a top or upper portion that is triangular in shape, such that the lower portion comprises of a slot base 14, and slot sides 16, and the upper portion comprises a slot angled tip 17, forming a slot tip angle 20.

Figure 2:
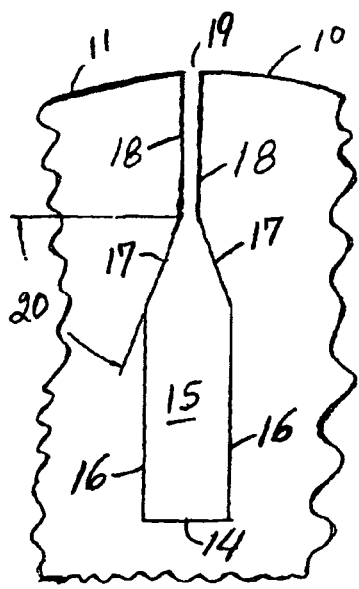
FIG. 2 is an enlarged detailed view showing the rotor bar slot along with the channel of the inventive motor rotor illustrated in FIG. 1.

FIG. 2 is an enlarged detailed view showing the rotor bar slot 15, along with the channel or opening 19, of the inventive motor rotor 23, illustrated in FIG. 1, where one can see that the peripheral hole or opening in the rotor 10, comprises the channel opening 19, and the rotor bar slot 15, such that this opening starts at the round peripheral edge 11, and terminates at the slot base 14, and is further defined by slot sides 16, slot angled tip 17, and the rotor channel sides 18.

Figure 3:
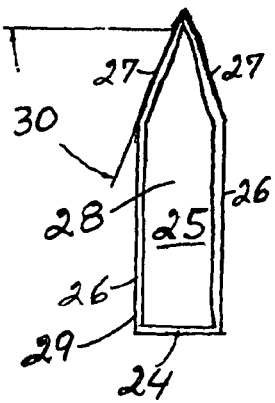
FIG. 3 is an enlarged detailed view showing the inventive rotor bar which is inserted into the rotor bar slot of the inventive motor rotor illustrated in FIG. 1.

FIG. 3 is an enlarged detailed view showing the inventive rotor bar 25, which is inserted into the rotor bar slot 15, of the inventive motor rotor 23, illustrated in FIG. 1. The inventive rotor bar 25, of this invention comprises of a base or lower portion that is rectangular and a top or upper portion that is triangular in shape, such that the lower portion comprises of a bar base 24, and bar sides 26, and the upper portion comprises a bar angled tip 27, forming a bar tip angle 30. For some configurations the rotor bar 25, has at least one layer of a rotor bar shim 29, which preferably envelopes or covers the rotor bar 25, especially around the peripheral surfaces of the rotor bar 25, that may come in contact with the walls of the rotor bar slot 15.

Figure 4:
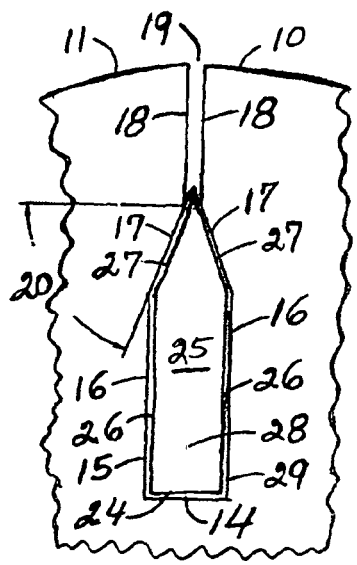
FIG. 4 is an enlarged detailed view showing the inventive rotor bar which is shown inserted inside the rotor bar slot of the inventive motor rotor illustrated in FIG. 1.

FIG. 4 is an enlarged detailed view showing the inventive rotor bar 25, which is shown having at least one layer of rotor bar shim 26, inserted inside the rotor bar slot 15, of the inventive motor rotor 23, illustrated in FIG. 1. However, as stated earlier this invention can be practiced with a rotor bar 25, that may or may not have a rotor bar shim 26. A person skilled in the art will also understand that the thickness of the rotor bar shim 26, will depend upon the application as well as the space or opening available within the rotor bar slot 15, to allow for a snug fit of the rotor bar 25, along with the rotor bar shim 26. Thus, for some applications same or different size rotor bars 25, may individually fit inside each corresponding rotor bar slot 15, in the rotor 10. Similarly, for some applications same or different size rotor bars 25, having same or different size rotor bar shim 26, may individually fit inside each corresponding rotor bar slot 15, in the rotor 10. As one can see that the shape of the rotor bar 25, is substantially similar to the shape of the rotor bar slot 15, and that the bar angled tip 27, points radially outwards towards the round peripheral edge 11, and a portion of the bar angled tip 27, sits inside the opening or channel 19.

The rotor 10, is preferably made of a metallic material, and wherein the metallic material is selected from a group comprising, aluminum, steel, copper, composite material, and combination thereof, to name a few.

The rotor bar 28, is preferably made of a metallic material, wherein the metallic material is selected from a group comprising, aluminum, steel, copper, composite material, and combination thereof, to name a few.

The rotor bar shim 29, is preferably made of a metallic material, wherein the metallic material is selected from a group comprising, aluminum, steel, copper, composite material, and combination thereof, to name a few.

The slot angled tip wall 17, has a slot tip angle 20, and wherein the slot tip angle 20, is between about 15 degree to about 80 degree, and preferably between about 30 degree to about 70 degree.

The bar angled tip wall 27, has a bar tip angle 30, and wherein the bar tip angle 30, is between about 15 degree to about 80 degree, and preferably between about 30 degree to about 70 degree.

The optional key slot or notch 13, within the central opening 12, in the rotor 10, is preferably selected from a group comprising, a trapezoidal key slot, a square key slot, a rectangular key slot, an elliptical key slot, a triangular key slot, and combination thereof, to name a few.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A motor rotor, comprising:
   (a) rotor having a substantially circular peripheral edge;
   (b) at least one channel inwardly opening from said peripheral edge and forming an inner entrance and a peripheral entrance;
   (c) a rotor bar slot, wherein said rotor bar slot has a slot base, two substantially parallel side walls originating from said slot base and each side wall terminating at a slot angled tip wall, and wherein said slot angled tip wall connects said rotor bar slot to said inner entrance of said channel, and thereby forming said motor rotor; and
   (d) a rotor bar within the rotor bar slot, the rotor bar having a rotor bar base, two substantially parallel side walls originating from said bar base and each side wall terminating at a bar angled tip wall, so as to form a substantially rectangular lower body and a substantially triangular upper body, with the bar angled tip wall recessed within the channel below the peripheral edge.

2. The motor rotor of claim 1, wherein, said rotor is made of a metallic material, and wherein said metallic material is selected from a group consisting of aluminum, steel, copper, composite material, and combination, thereof.

3. The motor rotor of claim 1, wherein said slot angled tip wall has a slot tip angle, and wherein said slot tip angle is between about 30 degree to about 70 degree.

4. The motor rotor of claim 1, wherein said rotor has a central opening and wherein said central opening has at least one key slot, and wherein said key slot is selected from a group consisting of a trapezoidal key slot, a square key slot, a rectangular key slot, an elliptical key slot, a triangular key slot, and combination thereof.

5. A rotor bar, comprising a rotor bar base, two substantially parallel side walls originating from said bar base and each side wall terminating at a bar angled tip wall forming an intersecting knife edge, so as to form a substantially rectangular lower body and a substantially triangular upper body, and thereby forming said rotor bar.

6. The rotor bar of claim 5, wherein said rotor bar is made of a metallic material, and wherein, said, metallic material is selected from a group consisting of aluminum, steel, copper, composite material, and combination thereof.

7. The rotor bar of claim 5, wherein said rotor bar has at least one layer of a rotor bar shim material wrapped about the base, side walls and angled tip walls substantially along the entire axial length thereof.

8. The rotor bar of claim 5, wherein said rotor bar has at least one layer of a rotor bar shim material wrapped about the base, side walls and angled tip walls substantially along the entire axial length thereof, and wherein said rotor bar shim comprises a metallic material.

9. The rotor bar of claim 5, wherein said rotor bar has at least one layer of a rotor bar shim material wrapped about the base, side walls and angled tip walls substantially along the entire axial length thereof, and wherein said rotor bar shim is a metallic material, and wherein said metallic material is selected from a group consisting of aluminum, steel, copper, composite material, and combination thereof.

10. The rotor bar of claim 5, wherein said bar angled tip wall has a bar tip angle and wherein said bar tip angle is between about 30 degree to about 70 degree.

11. A motor rotor, comprising:
   (a) a rotor having a substantially circular peripheral edge;
   (b) at least one channel inwardly opening from said peripheral edge and forming an inner entrance and a peripheral entrance;
   (c) a rotor bar slot, wherein said rotor bar slot has a slot base, two substantially parallel side walls originating from said slot base and each side wall terminating at a slot angled tip wall, and wherein said slot angled tip wall connects said rotor bar slot to said inner entrance of said channel;
   (d) a rotor bar, comprising a rotor bar base, two substantially parallel side walls originating from said bar base and each side wall terminating at a bar angled tip wall forming an intersecting knife edge, so as to form a substantially rectangular lower body and a substantially triangular upper body; and
   (e) wherein said rotor bar slot accommodates said rotor bar such that at least a portion of said triangular upper body is inside at least a portion of said channel recessed therein below the peripheral edge, and thereby forming said motor rotor.

12. The motor rotor of claim 11, wherein said rotor is made of a metallic material, and wherein said metallic material is selected from a group consisting of aluminum, steel, copper, composite material, and combination thereof.

13. The motor rotor of claim 11, wherein said slot angled tip wall has a slot tip angle, and wherein said slot tip angle is between about 30 degree to about 70 degree.

14. The motor rotor of claim 11, wherein said rotor has a central opening and wherein said central opening has at least one key slot, and wherein said key slot is selected from a group consisting of a trapezoidal key slot, a square key slot, a rectangular key slot, an elliptical key slot, a triangular key slot, and combination thereof.

15. The motor rotor of claim 11, wherein said rotor bar is made of a metallic material, and wherein said metallic material is selected from a group consisting of aluminum, steel, copper, composite material, and combination thereof.

16. The motor rotor of claim 11, wherein said rotor bar has at least one layer of a rotor bar shim material wrapped about the base, side walls and angled tip walls substantially along the entire axial length thereof.

17. The motor rotor of claim 11, wherein said rotor bar has at least one layer of a rotor bar shim material wrapped about the base, side walls and angled tip walls substantially along the entire axial length thereof, and wherein said rotor bar shim comprises a metallic material.

18. The motor rotor of claim 11, wherein said rotor bar has at least one layer of a rotor bar shim material wrapped about the base, side walls and angled tip walls substantially along the entire axial length thereof, and wherein said rotor bar shim is a metallic material, and wherein said metallic material is selected from a group consisting of aluminum, steel, copper, composite material, and combination thereof.

19. The motor rotor of claim 11, wherein said bar angled tip wall has a bar tip angle and wherein said bar tip angle is between about 30 degree to about 70 degree.

* * * * *